United States Patent
Baumgarten et al.

(10) Patent No.: US 12,284,944 B2
(45) Date of Patent: Apr. 29, 2025

(54) HARVESTING MACHINE WITH DRAPER USING CHARACTERISTIC DIAGRAMS

(71) Applicant: CLAAS Selbstfahrende Erntemaschinen GmbH, Harsewinkel (DE)

(72) Inventors: Joachim Baumgarten, Beelen (DE); Andreas Wilken, Bissendorf (DE); Dennis Neitemeier, Lippetal (DE); Bastian Bormann, Gütersloh (DE); Sebastian Spiekermann, Ostbevern (DE); Daniel Irmer, Herzebrock-Clarholz (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 270 days.

(21) Appl. No.: 17/953,816

(22) Filed: Sep. 27, 2022

(65) Prior Publication Data
US 2023/0099974 A1    Mar. 30, 2023

(30) Foreign Application Priority Data
Sep. 28, 2021   (DE) .................. 10 2021 125 099.4

(51) Int. Cl.
*A01D 41/14*    (2006.01)

(52) U.S. Cl.
CPC ......... *A01D 41/141* (2013.01); *A01D 41/142* (2013.01)

(58) Field of Classification Search
CPC ... A01D 41/141; A01D 41/142; A01D 41/127
(Continued)

(56) References Cited

U.S. PATENT DOCUMENTS

| 7,076,346 B2 * | 7/2006 | Sturges .................. E21F 13/08 299/1.7 |
| 8,667,770 B2 | 3/2014 | Fuechtling |

(Continued)

FOREIGN PATENT DOCUMENTS

| EP | 2382854 A1 | 11/2011 |
| EP | 2687924 A2 | 1/2014 |
| EP | 3123711 A1 | 2/2017 |

*Primary Examiner* — Andrew R Dyer
(74) *Attorney, Agent, or Firm* — Lempia Summerfield Katz LLC

(57) ABSTRACT

A driver assistance system of an agricultural harvesting machine with a harvesting header designed as a draper is disclosed. The driver assistance system comprises a memory for storing data and a computing device for processing the data saved in the memory. The draper comprises a central belt and at least one transverse conveyor belt arranged on the left side and the right side of the central belt for conveying the harvested material to the central belt. The draper forms, together with the driver assistance system, an automatic draper. The computing device operates the automatic draper as a characteristic diagram controller using the saved characteristic diagrams, with the automatic draper optimizing operating parameters of the draper and specifying the optimized operating parameters for the draper. The characteristic diagrams describe the relationship between the operating parameters and quality parameters, and a control characteristic curve is assigned to the particular characteristic diagram.

19 Claims, 11 Drawing Sheets

(58) Field of Classification Search
USPC .......................................................... 701/50
See application file for complete search history.

(56) References Cited

U.S. PATENT DOCUMENTS

| | | |
|---|---|---|
| 9,220,196 B2 | 12/2015 | Baumgarten |
| 9,807,926 B2 | 11/2017 | Wilken |
| 10,231,380 B2 | 3/2019 | Heitmann et al. |
| 10,412,887 B2 | 9/2019 | Füchtling et al. |
| 11,191,215 B1 * | 12/2021 | Robertson .......... A01D 41/1276 |
| 11,304,369 B2 | 4/2022 | Bormann et al. |
| 2003/0172636 A1 * | 9/2003 | Clauss ................. A01D 41/127 |
| | | 56/10.2 R |
| 2006/0248868 A1 * | 11/2006 | Otto .................... A01D 41/141 |
| | | 56/10.2 E |
| 2011/0270494 A1 | 11/2011 | Imhof et al. |
| 2013/0184944 A1 * | 7/2013 | Missotten ........... A01D 41/127 |
| | | 701/50 |
| 2017/0049045 A1 | 2/2017 | Wilken |
| 2018/0054964 A1 | 3/2018 | Füchtling et al. |
| 2019/0064817 A1 * | 2/2019 | Schmitt ................. G06N 3/126 |
| 2020/0337235 A1 * | 10/2020 | Blank ................. A01M 21/043 |
| 2021/0235622 A1 | 8/2021 | Baumgarten et al. |

* cited by examiner

HARVESTING MACHINE WITH DRAPER USING CHARACTERISTIC DIAGRAMS

CROSS REFERENCE TO RELATED APPLICATIONS

This application claims priority under 35 U.S.C. § 119 to German Patent Application No. 10 2021 125 099.4 filed Sep. 28, 2021, the entire disclosure of which is hereby incorporated by reference herein. The application is related to U.S. application Ser. No. 17/953,794 and to U.S. application Ser. No. 17/953,808, both of which incorporated by reference herein in their entirety.

TECHNICAL FIELD

The invention relates to an agricultural harvesting machine with a harvesting header designed as a draper for cutting and collecting harvested material, and with a driver assistance for controlling the draper.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

U.S. Pat. No. 9,807,926, incorporated by reference herein in its entirety, discloses a driver assistance systems for the semi-automated control of harvesting headers. In particular, U.S. Pat. No. 9,807,926 discloses an automatic cutting unit that is configured to optimize the operating parameters of a cutting unit associated with an agricultural harvesting machine as a function of selectable harvesting process strategies. The automatic machine described therein may optimize the operating parameters of conventional grain cutting units and may depend on the preselection of a specific process strategy. In this regard, the driver assistance system disclosed in U.S. Pat. No. 9,807,926 may be eminently suitable for optimizing operating parameters of conventional cutting units in a wide range of harvesting conditions.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
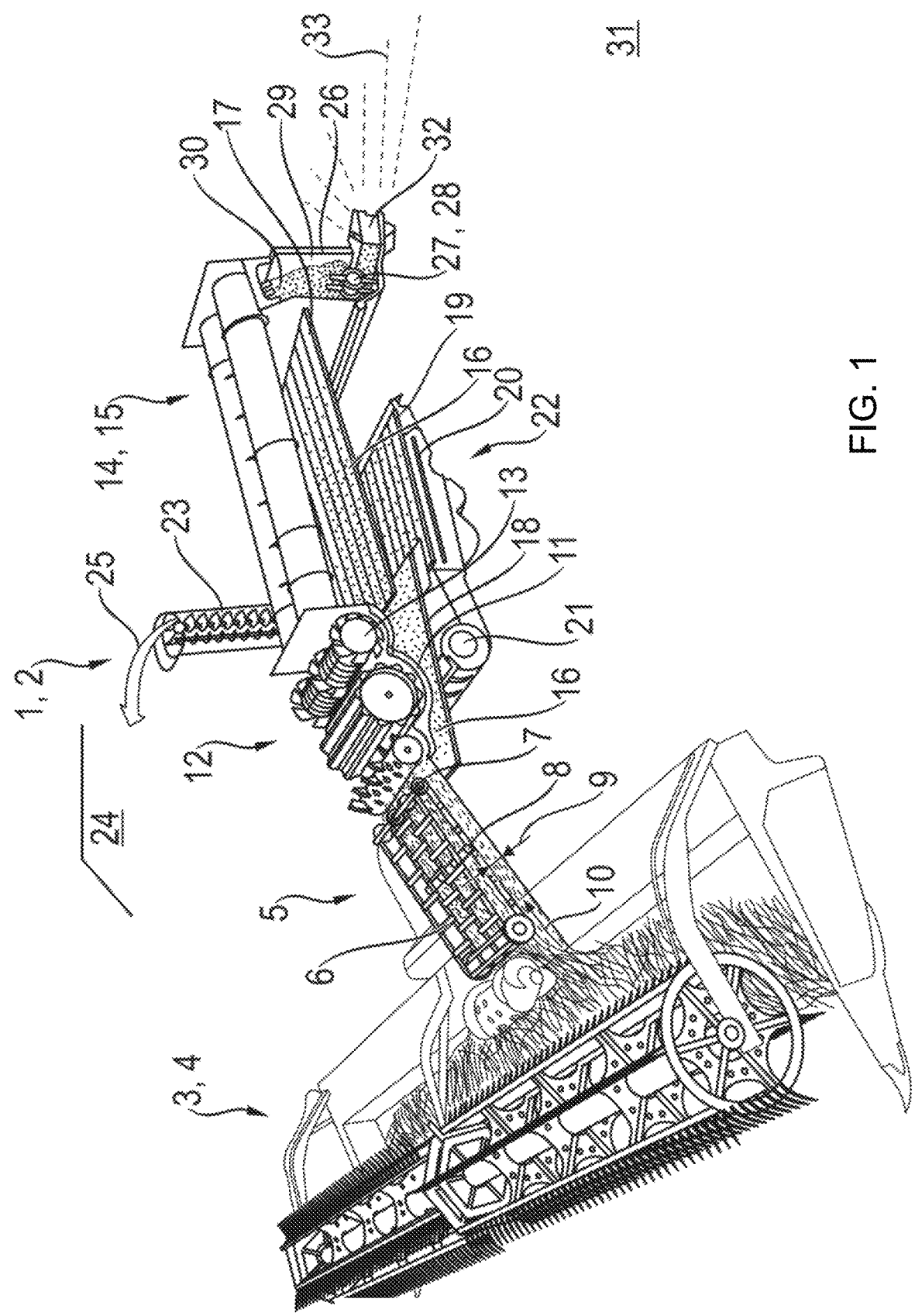
FIG. 1 illustrates a combine with draper that is only partially depicted.

As discussed in the background, driver assistance systems may automatically control of a cutting unit. A disadvantage of such an automatic system is that it may be coupled to special process unit(s) of a conventional cutting unit, and the improvement or optimization of the working units may be tied to harvesting process strategies. Further, the harvesting process strategies may depend on an operator request and may not be optimally implemented in certain circumstances in the prevailing harvesting conditions. In this case, the assistance system may not be able to direct the optimization to the most optimal area if this most optimal area is not covered by the selected process strategy.

Furthermore, U.S. Pat. No. 8,667,770, incorporated by reference herein in its entirety, discloses a draper. U.S. Pat. No. 10,412,887, incorporated by reference herein in its entirety, discloses controlling the belt speeds of the central belt and the transverse conveyor belts laterally associated therewith in coordination with each other and with the travel speed of the harvesting machine. A disadvantage may be that the complex interrelationships of the multitude of operating parameters of a draper, which all may have an influence on an optimized low-loss harvested material flow in the draper, may not be taken into account, since only the belt speeds may be coordinated with each other.

Thus, in one or some embodiments, a draper system is disclosed which enables improved, such as optimized, low-loss transport of the harvested material through the draper into the inclined conveyor of the agricultural harvesting machine.

In one or some embodiments, the agricultural harvesting machine may be equipped with a harvesting attachment designed or configured as a draper for cutting and picking up (e.g., collecting) harvested material, and with a driver assistance system (interchangeably termed an operator assistance system) configured to control the draper. The driver assistance system may comprise a memory for storing data and a computing device (e.g., at least one controller or processor) for processing the data saved in the memory. The draper may comprise at least one central belt configured to convey harvested material to a transverse conveying screw and/or to an intake channel of an inclined conveyor and at least one transverse conveyor arranged on the left side and one on the right side of the central belt for conveying the harvested material to the central belt. The central belt, the left side transverse conveyor belt and the right side transverse conveyor belt may be arranged or positioned downstream of a cutter bar in the direction of travel, and the belt cutting mechanism may accommodate a reel at the top, wherein the draper may form, together with the driver assistance system, an automatic draper. Specifically, characteristic diagrams may be saved or stored in the memory of the driver assistance system, and the computing device may be configured to operate the automatic draper (e.g., automatically control one or more aspects of operation of the draper for automatic implementation) as a characteristic diagram controller (e.g., a characteristic diagram control device) using the saved characteristic diagrams. In particular, the automatic draper may be configured, using the characteristic diagram(s), to select one or more operating parameters, such as selecting operating parameter(s) to optimize one or more operational aspects of the draper, and specify the selected one or more operating parameters (such as the optimized operating parameters) to the draper. Merely by way of example, a respective characteristic diagram may correlate any two or more of measured parameter(s), quality parameter(s), and operating parameter(s). The correlation may be manifested in a curve, or the like. The automatic draper, using the respective characteristic diagram, may determine the value(s) for the operating parameters given a value for the quality parameter(s). In the example of the correlation comprising a curve, the value of a respective quality parameter, using the curve, may result in a particular value (which may be considered an optimized value) of the operating parameter. In turn, the draper, receiving the selected one or more operating parameters (e.g., the optimized value for the respective operating parameter), may automatically modify its operation using the selected one or more operating parameters, thereby improving (such as optimizing) the operation of the draper (e.g., implementing the optimized value of the operating parameter may result in optimized operation of the draper). In this way, it may be ensured that the draper enables or permits an optimized low-loss transport of the harvested material through the draper to the inclined conveyor of the agricultural harvesting machine.

In one or some embodiments, any one, any combination, or all of the following may form process units of the draper (and may further be automatically controlled): the right-sided and/or left-sided transverse conveyor belt; the central belt; the feed roller; or the reel and/or the cutter bar. The automated draper may be configured to select, such as improve or optimize, the operating parameters based on the characteristic diagram(s) of one or more of these process units and to specify the operating parameters, such as the optimized operating parameters, to the particular process unit. In turn, the particular process unit of the draper may automatically implement the specified operating parameters, in turn resulting in improved operation of the particular process unit. This may have the effect that the material flow in the draper may be comprehensively optimized, since some or all essential process units of the draper may be controlled by the automatic draper on the basis of characteristics, such as characteristic diagrams. This may also have the effect that optimized material flow may result in lower or fewer cutter losses.

In one or some embodiments, the automatic draper may be configured to form process unit-specific automated subunits in such a way that the automatic draper forms any one, any combination, or all of: automatic transverse conveyor belt machine(s); an automatic central belt; an automatic reel machine; an automatic cutter bar; or an automatic feed roller. The particular automated subunits may be configured to optimize the operating parameters of any one, any combination, or all of: the transverse conveyor belts; the central belt; the reel; the cutter bar; or the feed roller of the draper. Further, the automated subunits may be configured to specify the optimized operating parameters to the particular process unit of the draper to ensure that the material flow optimization in the draper may be influenced very specifically, such as depending on the process unit (e.g., the particular process unit).

In one or some embodiments, the one or more characteristic diagrams assigned to the automatic draper may be such that they describe the relationship between operating parameters of a process unit and quality parameters. In particular, this may have the effect that the influence of each individual process unit on material flow optimization in the draper may be controlled in a targeted manner. For example, responsive to determining a quality parameter(s) to focus on, the correlated operating parameter(s), based on the characteristic diagram(s), may be determined. In this context, it may be advantageous if one or more characteristic diagrams are assigned to each automated subunit, wherein the one or more characteristic diagrams may describe at least the relationship between operating parameters of the process unit assigned to the particular automated subunit and quality parameters. In this way, it may be possible to control each process unit of the draper very specifically, since experience has shown that the individual process units may have very different influences on the material flow in the draper.

In one or some embodiments, a significant influence, such as the most significant influence, on the movement of a flow of harvested material through a draper is the harvested material throughput, wherein very high or very low harvested material throughputs may cause disturbances in the flow of harvested material within the draper or during the transfer of the flow of harvested material to the combine. It may therefore be advantageous if the particular characteristic diagram takes into account a parameter representing the harvested material throughput, such as the layer height.

Against the background that the speed of movement of the flow of harvested material through the draper may be decisively determined by the belt speed of the right and left side transverse conveyor belts and the central belt, it may be provided that the operating parameter of the "right side transverse conveyor belt" process unit to be optimized may at least be the belt speed of the right side transverse conveyor belt, the operating parameter to be optimized of the "left side transverse conveyor belt" process unit comprises may at least be the belt speed of the left side transverse conveyor belt, and the operating parameter to be optimized of the central belt process unit may comprise at least the belt speed of the central belt.

In one or some embodiments, the reel associated with a draper is such that it may also exert a conveying effect on the flow of harvested material in the draper, so that a further advantageous embodiment of the invention provides that the operating parameter of the reel process unit to be optimized comprises at least the reel vertical position and/or the reel horizontal position.

In one or some embodiments, the flow of harvested material passing through the draper may be detected in a central area of the draper by a so-called feed roller and may be transferred to the combine, in this case initially to the inclined conveyor shaft. In order for an optimum flow of material to be maintained during the transfer of the flow of harvested material from the draper to the inclined conveyor, it is provided that the operating parameter of the feed roller process unit to be optimized comprises at least the feed roller horizontal position and/or the feed roller speed.

In one or some embodiments, cutting of harvested material cut by the cutter bar which is not adapted to the particular harvesting conditions and the travel speed of the harvesting machine may lead to jams of material when the flow of harvested material enters the draper. In this regard, the operating parameter of the cutter bar process unit to be optimized may comprise at least the cutting speed and/or the cutter stroke.

Various quality parameters are contemplated. In one or some embodiments, the quality parameter or parameters of the one or more characteristic diagrams are a vibration coefficient and/or a separation loss. The vibration coefficient may be an indicator of the layer height variations and thus of an inhomogeneous material flow. The separation loss may be an essential parameter describing the working quality of a combine, wherein increasing separation losses may also be an indication of a non-optimal material flow of the flow of harvested material through the combine.

Since the vibration coefficient describes a fluctuation of the harvested material throughput, and means are provided which may determine a harvested material throughput and the vibration coefficient describing the fluctuation of the harvested material throughput in a region lying in front of the threshing units of the agricultural harvesting machine, it may be found in an advantageous further development of the invention that the parameter most clearly describing an inhomogeneous harvested material flow may be decisively considered in the optimization of the harvested material flow in the draper. Moreover, since the vibration coefficient may also be determined in a region located upstream from the threshing units, the influence of the threshing units, which may completely alter the harvested material flow structure, may be excluded.

In one or some embodiments, the additional quality parameter comprises the separation loss, since this quality parameter may describe the grain loss, and the grain loss may be a parameter significantly determining the working quality of the agricultural harvesting machine.

In one or some embodiments, the particular characteristic diagram therefore may describe the particular operating parameter as a function of one or more quality parameters, such as a function of the vibration coefficient and/or the layer height representing the harvested material throughput. In this context, it may therefore also be advantageous if, in a further embodiment, the particular characteristic diagram describes the particular operating parameter or parameters to be optimized at least as a function of the separation loss.

Against the background that the characteristic diagrams may describe parameter correlations within a large, such as spatial, value range, it is provided that a control characteristic curve may be assigned to the particular characteristic diagram, and the control characteristic may lie around the minimum of the respective vibration coefficient or separation loss. This may simplify the process of determining the most optimal value in the characteristic diagram for an operating parameter to be optimized.

A particularly efficient use of a characteristic curve-based characteristic diagram control may result when the particular characteristic diagram is designed as an initial characteristic diagram. In the initial characteristic diagram, at least the correlation of operating parameters of a process unit and quality parameters may be described by initial operating points. In one or some embodiments, in harvesting mode, instantaneous operating points may be determined as a function of measured variables. The instantaneous operating points may be converted into quasi-stationary operating points. And, the determined quasi-stationary operating points may overwrite some or all of the corresponding operating points of the particular characteristic diagram so that the initial characteristic diagram is converted or modified into an updated characteristic diagram.

In this context, it may be advantageous if the measured variables comprise any one, any combination, or all of: the longitudinal vibration and/or the transverse vibration of a flow of harvested material passing through the agricultural harvesting machine; the crop height; or the hydraulic pressure or power requirement of a reel drive motor. The characteristic diagram control may also work effectively when the measured variables are converted directly into the quality parameters or a harvested material throughput. In either instance, there may be a translation of the measured variables into the quality variables used in the characteristic diagram(s).

In order to keep the influence of measurement errors within limits, it may be provided that the instantaneous operating point changes to a quasi-stationary operating point if one or more measured variables remain approximately constant within a time interval, such as within a time interval of 6 seconds. In this context, it may also be advantageous if the time interval is selected or configured in such a way that a dead time interval (discussed further below) in the measuring chain is compensated, wherein the dead time interval may be determined to a significant extent by half the cutter width and the conveying speed of the material flow, since it may take longer as the cutter width increases until the flow of harvested material may be detected in the region of the so-called layer height roller.

In one or some embodiments, efficient characteristic diagram control may be achieved when the characteristic diagram describes the relationship between the quality parameter "vibration coefficient", the parameter "layer height" representing the harvested material throughput, and the operating parameter "middle conveyor belt speed". This is an example of the characteristic diagram correlating the quality parameter (which may be set) and a parameter (which may be measured, such as the "layer height"), with an operating parameter (which may be controlled, such as the "middle conveyor belt speed"). In practice, responsive to sensing the parameter (e.g., sensing the "layer height") and responsive to identifying the quality parameter (e.g., the "vibration coefficient"), the characteristic diagram control device may, using the characteristic diagram, determine the operating parameter (e.g., the "middle conveyor belt speed"). In one or some embodiments, the control characteristic curve assigned to the characteristic diagram may lie around the minimum vibration coefficient.

Efficient characteristic diagram control may also be achieved if, according to a further embodiment, the characteristic diagram describes the relationship between the quality parameter "vibration coefficient," the layer height parameter representing the harvested material throughput, and the operating parameter "belt speed of right side and/or left side transverse conveyor belt". In particular, the characteristic diagram may correlate the quality parameter "vibration coefficient" and the layer height parameter representing the harvested material throughput (effectively acting as inputs to the characteristic diagram), in order to determine the operating parameter (e.g., "belt speed of right side and/or left side transverse conveyor belt", effectively acting as the output of the characteristic diagram). Further, the control characteristic associated with the characteristic diagram may lie around the minimum vibration coefficient (which may seek to minimize the vibration).

In this context, it may also be advantageous if the characteristic diagram describes the relationship between the quality parameter "vibration coefficient," the layer height parameter representing the harvested material throughput, and one or more operating parameters, such as the operating parameter "reel horizontal position and/or reel vertical position". The control characteristic curve that is assigned to the characteristic diagram may lie around the minimum the vibration coefficient.

Against the background that a non-optimal flow of harvested material in the area of the draper may also have negative effects on the separation loss, it is provided that the characteristic diagram may describe the relationship between the quality parameter separation loss and the operating parameters speed of the central belt and speed of the left side and/or right side transverse conveyor belt. In particular, the characteristic diagram may correlate the quality parameter separation loss with the operating parameters speed of the central belt and speed of the left side and/or right side transverse conveyor belt. Further, the control characteristic associated with the characteristic diagram may lie in the area of the minimum of the separation loss. In this context, it may also be advantageous if the characteristic diagram describes the relationship between the quality parameter separation loss, the parameter hydraulic pressure or power requirement of a reel drive motor/reel drive cylinder representing the harvested material throughput and the operating parameter reel horizontal position and/or reel vertical position. In particular, the characteristic diagram may correlate the quality parameter separation loss with one or more operating parameters, such as any one, any combination, or all of the parameter hydraulic pressure or power requirement of a reel drive motor/reel drive cylinder representing the harvested material throughput and the operating parameter reel horizontal position and/or reel vertical position. Responsive to using the characteristic diagram, the one or more operating parameters may be determined so that the draper may be automatically controlled responsive to implementing the determined one or more operating parameters. Further, the control characteristic curve assigned to the characteristic diagram may lie around the minimum of the separation loss.

In one or some embodiments, the adaptation of the particular characteristic diagram as a function of the vibration coefficient may cause a fast, dynamic adaptation (such as a faster adaptation) of the particular characteristic diagram (such as a faster characteristic diagram), while the adaptation of the particular characteristic diagram as a function of the separation loss may cause a slow, sluggish adaptation (such as a slower adaptation) of the particular characteristic diagram (such as a slower characteristic diagram). In this regard, it may be ensured that the influence of both short-term and long-term effects may be considered when optimizing the operating parameters of the draper.

A particularly effective driver assistance system may be achieved if the draper together with the driver assistance system form an automatic draper which is configured to be operated as characteristic diagram controller (e.g., a characteristic diagram control device), in that characteristic diagrams may be saved in the memory of the driver assistance system, and the computing device may be configured to operate the automatic draper as a characteristic diagram controller using the saved characteristic diagrams. Further, the driver assistance system may further be configured to perform any one, any combination, or all of: a. determine measured variables of the draper and/or of the agricultural working machine; b. derive instantaneous operating points at least from the determined measured variables; c. convert the instantaneous operating point into a quasi-stationary operating point; d. transfer the quasi-stationary operating point to the particular automatic draper or to one or more automated subunits; e. transfer it, in the particular automatic draper or automated subunit, to the initial characteristic diagram saved therein, or to the characteristic diagram that has already been updated (e.g., the already updated characteristic diagram); f. replace, in the particular characteristic diagram, an initial operating point or an already updated operating point with a quasi-stationary operating point; g. take into account the inserted quasi-stationary operating points, to calculate an updated characteristic diagram; h. determine the control characteristic of the updated characteristic diagram; i. determine optimized operating parameters (e.g., optimized working parameters) by means of the updated control characteristic (e.g., an updated control characteristic curve); j. specify the optimized operating parameter to the particular process aggregate.

In order to sufficiently take into account the influence of short-term and long-term effects on the optimization of an operating parameter, it may be provided that the adaptation of the characteristic diagram may comprise super positioning (interchangeably superimposing) two characteristic diagrams, such as comprising a superposition (interchangeably superimposing) of a dynamic characteristic diagram adaptation "vibration coefficient," and an inertial characteristic diagram adaptation "separation loss". In this context, it may be advantageous if the dynamic characteristic diagram adaptation is effected by the quality parameter of the particular characteristic diagram being formed by the oscillation coefficient, since the latter detects layer height fluctuations very precisely and in a region close to the draper. Since the sluggish characteristic diagram adaptation may be because the quality parameter of the particular characteristic diagram is formed by the separation loss, it may be ensured that long-term effects are also considered when optimizing the operating parameters of the process units of the draper.

In view of the fact that one and the same operating parameter to be optimized may be defined in the saved characteristic diagrams as a function of different quality parameters, in one or some embodiments, the driver assistance system is configured to check in a test step whether opposing tendencies for the value of the particular optimized operating parameter occur for the operating parameter to be optimized when dynamic characteristic diagram adaptation and sluggish characteristic diagram adaptation are used. In this context, it may be advantageous if boundary conditions are used to decide which optimum characteristic diagram and/or optimum mean characteristic diagram is approached. In one or some embodiments, the mentioned boundary conditions may be saved in a cost function which may take into account the parameters throughput/h, vibration coefficient, separation losses, cutter losses, wherein these parameters may be weighted differently.

In one or some embodiments, the quality of the characteristic diagram control may also be further increased if the driver assistance system takes expert knowledge into account when generating the particular characteristic diagrams.

The driver assistance system may be used very effectively especially if at least the cutter bar and the transverse conveyor belts downstream therefrom are designed to be flexible, since this optimized adaptation of the process units to ground contours has a significant effect on the flow of harvested material in the draper, since its ground area may change constantly in both longitudinal and transverse directions.

Referring to the figures, the agricultural harvesting machine 1 shown schematically in FIG. 1, designed as a combine 2, accommodates in its front area a harvesting header 3 designed as a draper 4, which may be connected in a manner known to one of skill in the art to the inclined conveyor 5 of the combine 2. The conveying elements 6 of the inclined conveyor 5 may be guided on the upper side so as to be pivotable about a pivot axis 7 transversely to the longitudinal direction of the combine 2. In the shown embodiment, a so-called layer height roller 8, which is known per se but will be explained in more detail later, is associated with the conveying elements 6 in a central region, the deflection of which roller in the vertical direction is a measure of the layer height 9 of the flow of harvested material 10 passing through the inclined conveyor 5. The flow of harvested material 10 passing through the inclined conveyor 5 may be transferred in the upper rear region of the inclined conveyor 5 to the threshing units 12 of the combine 2, which may at least be partially surrounded by a so-called threshing concave 11 on the bottom. A diverter roller 13 downstream from the threshing units 12 may divert the flow of harvested material 10 out of the threshing units 12 in their rearward area so that the flow is immediately transferred to a separating device 15 designed as a separating rotor assembly 14. Within the scope of the invention, the separating device 15 may also be designed as a known, and therefore not shown, straw walker. It is also contemplated that the separating device is designed only with a single-rotor, or the threshing units 12 and the separating device 15 are combined to form a single- or double-rotor axial flow threshing and separating device.

In the separating device 15, the flow of harvested material 10 may be conveyed in such a way that free-moving grains 16 contained in the flow of harvested material 10 are separated in the downstream region of the separating device 15. The grains 16 deposited both on the threshing concave 11 as well as in the separating device 15 may be fed over a returns pan 17 and a feed pan 18 of a cleaning device 22 comprising (or consisting of) a plurality of screening levels 19, 20 and a fan 21. The cleaned flow of grains 25 may then be transferred using elevators 23 to a grain tank 24.

In the rear region of the separating device 15, a shredding device 28, designed as a straw chopper 27 and surrounded by a funnel-shaped housing 26, may be associated with the separating device 15. The straw 30 leaving the separating device 15 in the rear region may be fed to the straw chopper 27 at the top. Using a pivotable straw guide flap 29, the straw 30 may also be deflected in such a way that it is deposited directly on the ground 31 in a swath.

In the outlet area of the straw chopper 27, the flow of harvested material comprising (or consisting of) the chopped straw 30 and the non-grain components separated in the cleaning device 22 may be transferred to a crop distribution device 32 which may discharge the residual material stream 33 in such a way that a wide distribution of the residual material stream 33 occurs on the ground 31.

Figure 2:
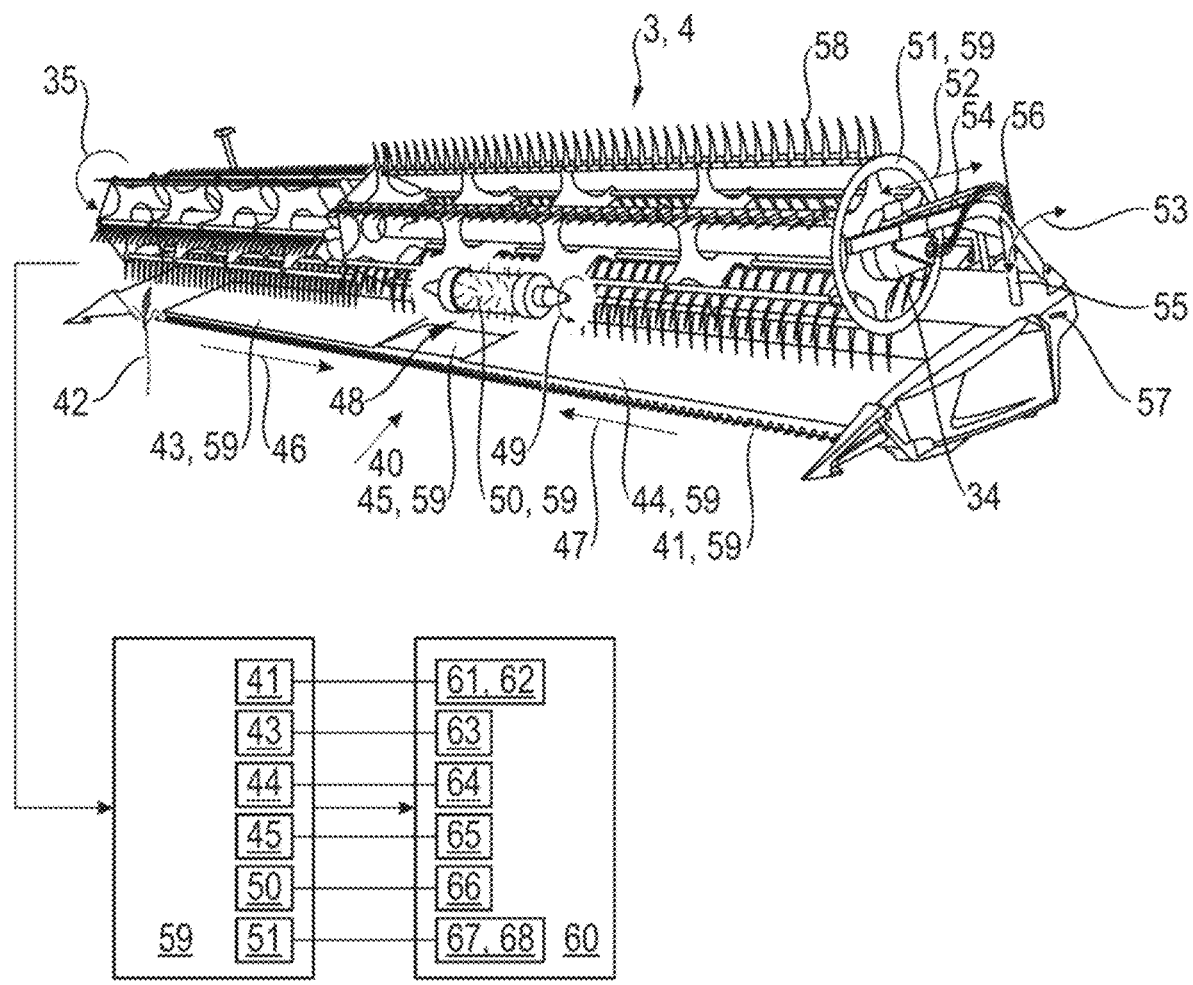
FIG. 2 illustrates a detailed view of the draper according to FIG. 1.

FIG. 2 illustrates the essential details of the harvesting header 3, which may be designed as a draper 4. In the harvested material infeed side region 40, the draper 4 may accommodate a cutter bar 41 of either rigid or flexible design, which cuts off the crop 42 to be harvested. A flexibly designed cutter bar 41 may better follow changes in the ground contour in the longitudinal and transverse direction in a known manner. In the depicted embodiment, a left side transverse conveyor belt 43, a right side transverse conveyor belt 44 and a central belt 45 are associated with the cutter bar 41 as viewed in the direction of arrow 40. The left side transverse conveyor belt 43 may convey the harvested crop 42, which it has picked up, in the direction of arrow 46 in the direction of the central belt 45 and transfers it thereto. Similarly, the right side transverse conveyor belt 44 may convey the harvested crop 42 that it has picked up in the direction of arrow 47 in the direction of the central belt 45, and transfers it thereto. The central belt 45 then may convey the crop 42 which it has picked up and which has been transferred to the central belt 45 by the transverse conveyor belts 43, 44 into the rear region of the draper 4 in the direction of the arrow 48. In this rear region, the crop 42 may detected by a feed roller 50, which may be associated with this region and may rotate in the direction of arrow 49, and may be transferred to the inclined conveyor 5 as the aforementioned flow of harvested material 10. On the upper side, the draper 4 may receive a reel 51 designed in one or more parts. The position of the reel 51 may be adjusted horizontally in a manner known per se in the direction of arrow 52 and vertically in the direction of arrow 53; in the simplest case, lifting cylinders 54, 55 may be positioned on the reel support arm 56 and on the frame 57 of the draper 4 for executing these movements (as indicated by arrows 52, 53). The lifting cylinders 54, 55 may be arranged or positioned on both sides of the draper 4. Moreover, the position of the driving tines 58 of the reel 51 may be adjustable in a manner known per se and therefore will not be explained in detail. In addition, a reel drive motor 34 may be associated with the reel 51 at least on one side, which may set the reel 51 in rotary motion in the direction of arrow 35. According to one or some embodiments, any one, any combination, or all of the cutter bar 41, the left side and right side transverse conveyor belts 43, 44, the central belt 45, the feed roller 50 and the reel 51 may form the particular process units 59 of the draper 4. Each of these process units 59 may be associated with operating parameters 60, wherein the operating parameter of the cutter bar 41, the cutting speed 61 and/or the cutter stroke 62, the operating parameter of the left side transverse conveyor belt 43, the right side transverse conveyor belt 44 and the central belt 45 is the particular belt speed 63-65, the operating parameter of the feed roller 50 is the feed roller horizontal position 66 and/or the feed roller speed 49, and the operating parameter of the reel 51 is the reel vertical position 67 and/or the reel horizontal position 68.

Figure 3:
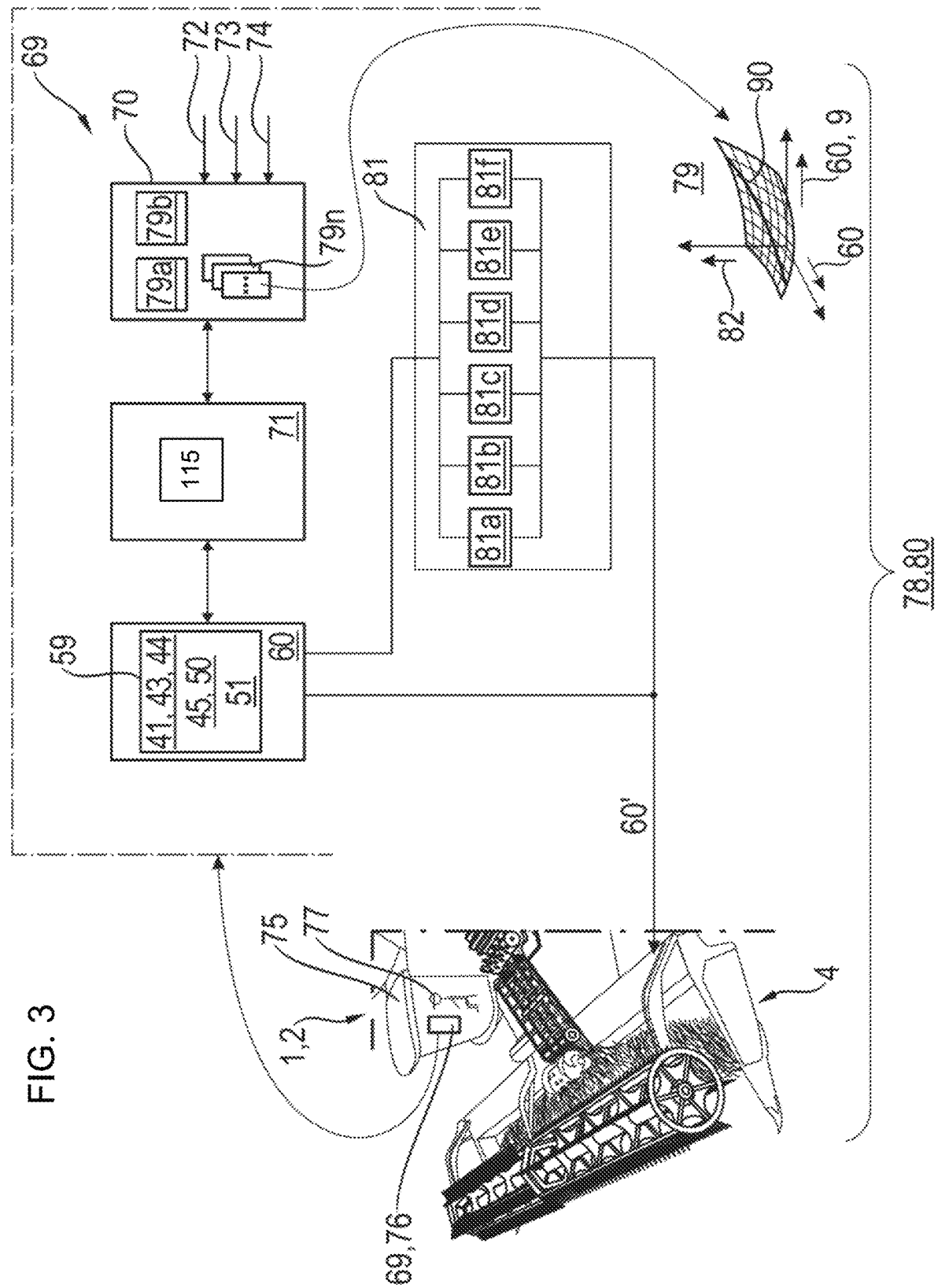
FIG. 3 illustrates a schematic representation of the driver assistance system.

According to FIG. 3, the disclosed agricultural production machine 1 has a driver assistance system 69 for controlling the draper 4. The driver assistance system 69 may comprise a memory 70 for saving data, to be explained in more detail, and a computing device 71 for processing the data saved in the memory 70.

The computing device 71 may include any type of computing functionality, such as at least one processor 115 (which may comprise a microprocessor, controller, PLA, or the like) and at least one memory (such as memory 70 or a separate memory). The memory may comprise any type of storage device (e.g., any type of memory). Though the processor 115 and the memory 70 are depicted as separate elements, they may be part of a single machine, which includes a microprocessor (or other type of controller) and a memory. Alternatively, the processor 115 may rely on memory 70 for all of its memory needs.

The processor 115 and memory are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. Further, the functionality discussed herein, such as the determination of the parameters (e.g., using the characteristic diagrams to determine operating parameter(s) for automatic control of the draper), or the actuation of the control (e.g., sending commands to control one or more parts of various devices, such as the draper), may be performed by the computing functionality. In practice, the computing device 71 may send the one or more commands via wired or wireless communication.

The data saved in the memory 70 may initially comprise any one, any combination, or all of information 72 generated by internal machine sensor systems, information 73 generated by external systems, or information 74 saved directly in the computing device. The data saved in memory 70 may further comprise information 72, 73, 74 generated during operation of the agricultural harvesting machine. The driver assistance system 69 may be operated via a control and display unit 76 arranged or positioned in the cab 75 of the combine 2. In principle, the driver assistance system 69 may be configured to assist a driver 77 of the combine 2 to operate the combine 2.

In one or some embodiments, the draper 4, together with the driver assistance system 69, may form an automatic draper 78. Alternatively, the driver assistance system, configured to use the characteristic diagrams 79, to automatically determine the operating parameters based on the characteristic diagrams 79, and to automatically send the operating parameters to the draper 4 (for the draper to automatically execute), may form the automatic draper 78. As disclosed, this may be realized in that characteristic diagrams 79 described in further detail below are saved in the memory 70 of the driver assistance system 69, and the computing device 71 may be configured to operate the automatic draper 78 as a characteristic diagram controller 80 using the saved characteristic diagrams 79. In practice, the driver assistance system 69 may be configured to automatically determine, based on the characteristic diagrams 79, operating parameters of the draper 4 (e.g., values for the operating parameter(s) of the draper 4). In turn, the driver assistance system 69 may send the operating parameters (such as in the form of commands indicative of the values for the operating parameter(s)) to the draper 4 in order for the draper 4 to automatically implement them. In particular, the automatic draper 78 may be configured to optimize operating parameters 60 of the draper 4 and to specify the optimized operating parameters 60' to the draper 4, wherein according to the previous embodiments, the operating parameters 60 may be associated with process units 59 of the draper 4. Example process units 59 essentially may comprise any one, any combination or all of the right side and the left side transverse conveyor belt 43, 44, the central belt 45, the feed roller 50, the reel 51 and/or the cutter bar 41. In this way, the automatic draper 78 may be configured to optimize the operating parameters 60 of one or more of these process units 59 and to specify the optimized operating parameters 60' to the particular process unit 41, 43, 44, 45, 50, 51.

In addition, the automatic draper 78 may be configured to form process-unit-specific automated subunits 81 in such a way that the automatic draper 78 forms any one, any combination, or all of one or more automatic transverse conveyor belts 81a, 81b, an automatic central belt 81c, an automatic reel 81d, an automatic cutter bar 81e and/or an automatic infeed roller 81f. Further, the particular automated subunits 81a, 81b, 81c, 81d, 81e, 81f may be configured to optimize the operating parameters 60 of the transverse conveyor belts 43, 44, the central belt 45, the reel 51, the cutter bar 41 and/or the feed roller 50 of the draper 4, and to specify the optimized operating parameters 60' to the particular process unit 59 of the draper 4.

The one or more characteristic diagrams 79 associated with the automatic draper 78 may be such that they describe the relationship between one or more operating parameters 60 of one or more process units 59 and the quality parameters 82, explained in greater detail below. Analogously, one or more characteristic diagrams 79 may also be associated with each automated subunit 81a, 81b, 81c, 81d, 81e, 81f, wherein the one or more characteristic diagrams 79 may describe at least the relationship between one or more operating parameters 60 of the process unit 59 associated with the particular automated subunit 81a, 81b, 81c, 81d, 81e, 81f and the quality parameters 82 explained in greater detail below. The particular characteristic diagram 79 associated with the automatic draper 78 or the automated subunits 81 may also take into account a parameter representing the harvested material throughput, such as the layer height 9.

Figure 4A:
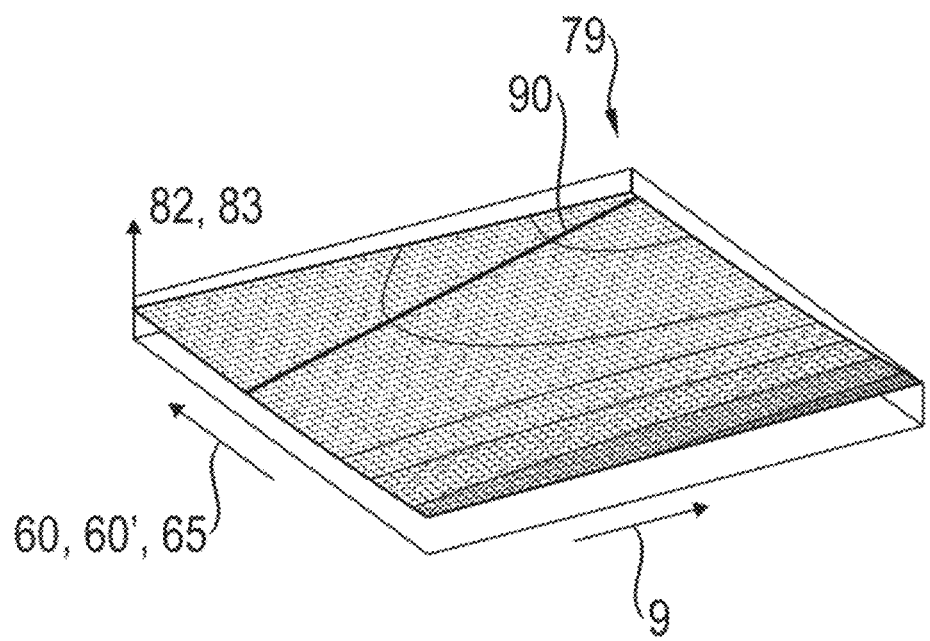
FIGS. 4A-C illustrate a first detailed representation of the characteristic diagrams.
Figure 4B:
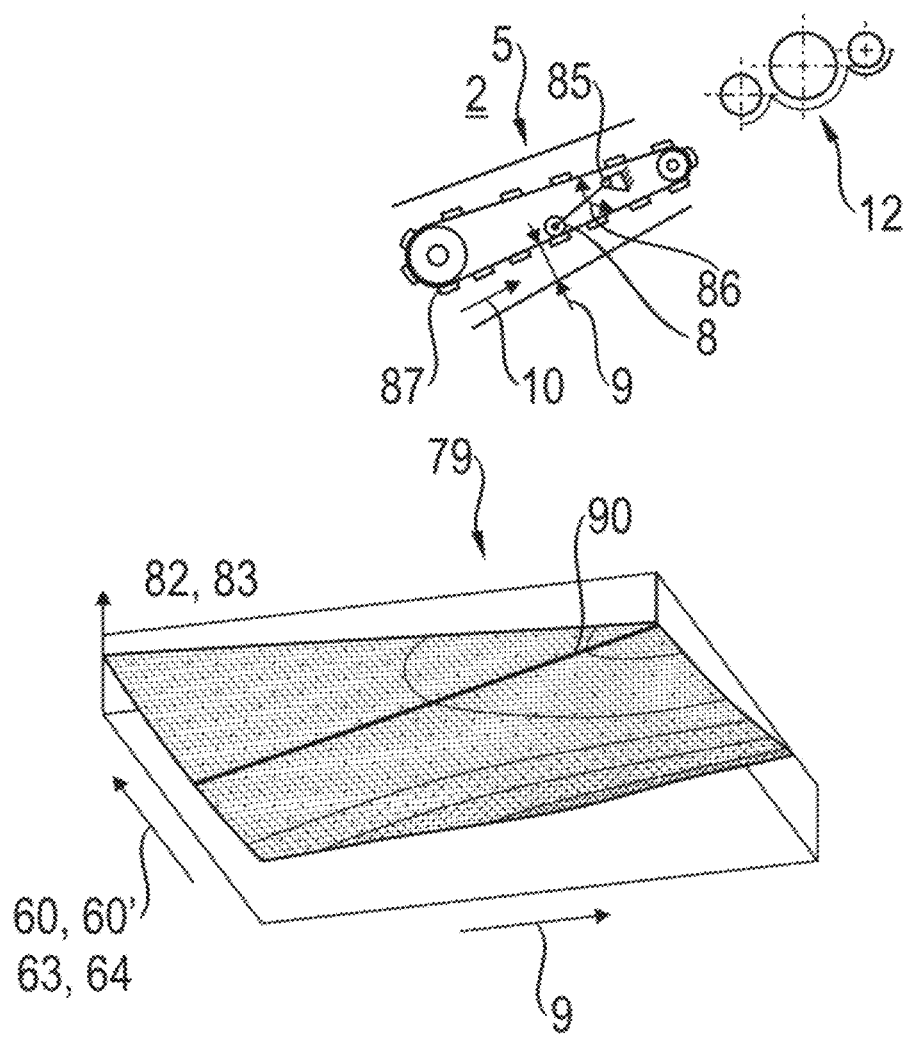
Figure 4C:
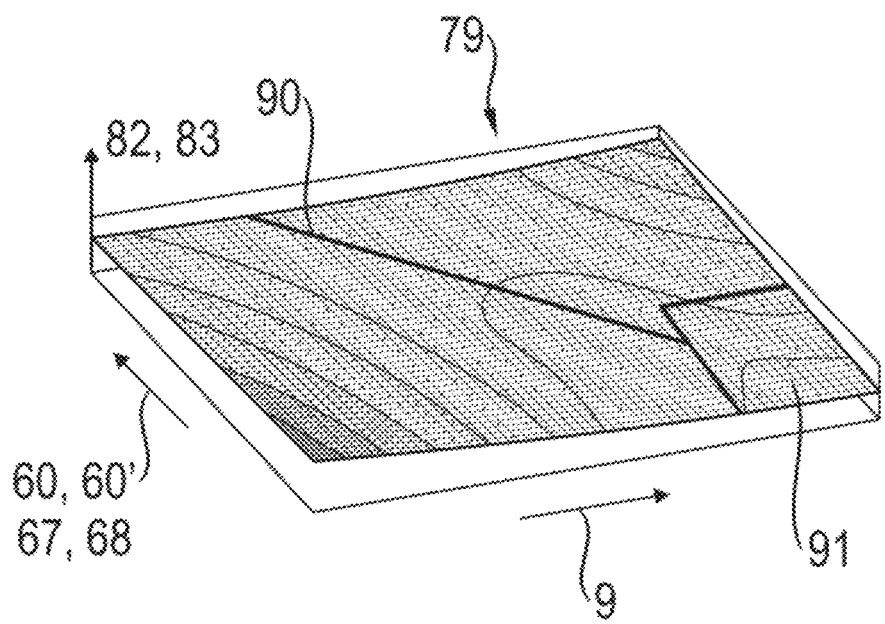
Figure 5A:
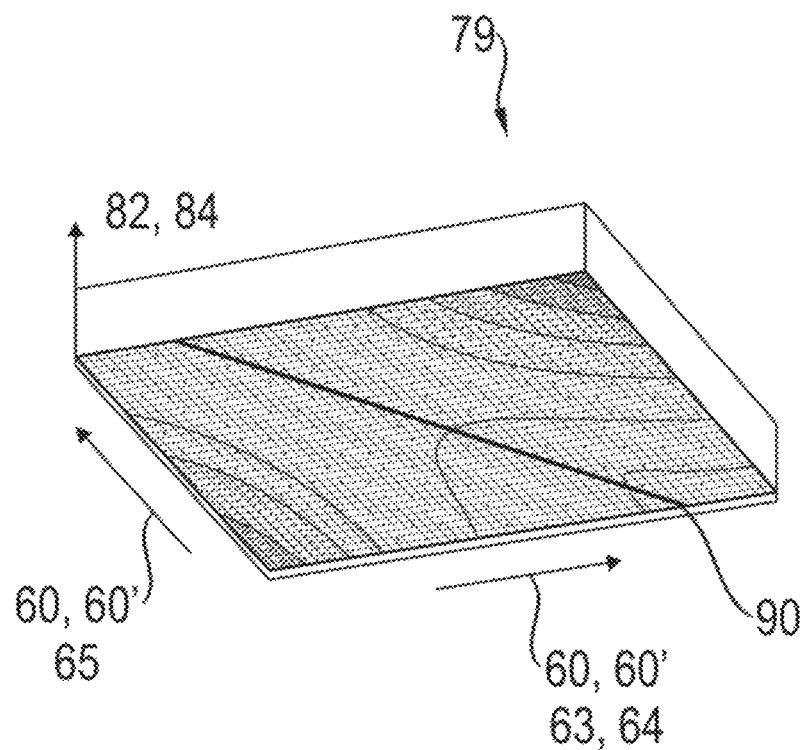
FIGS. 5A-B illustrate a second detailed representation of the characteristic diagrams.
Figure 5B:
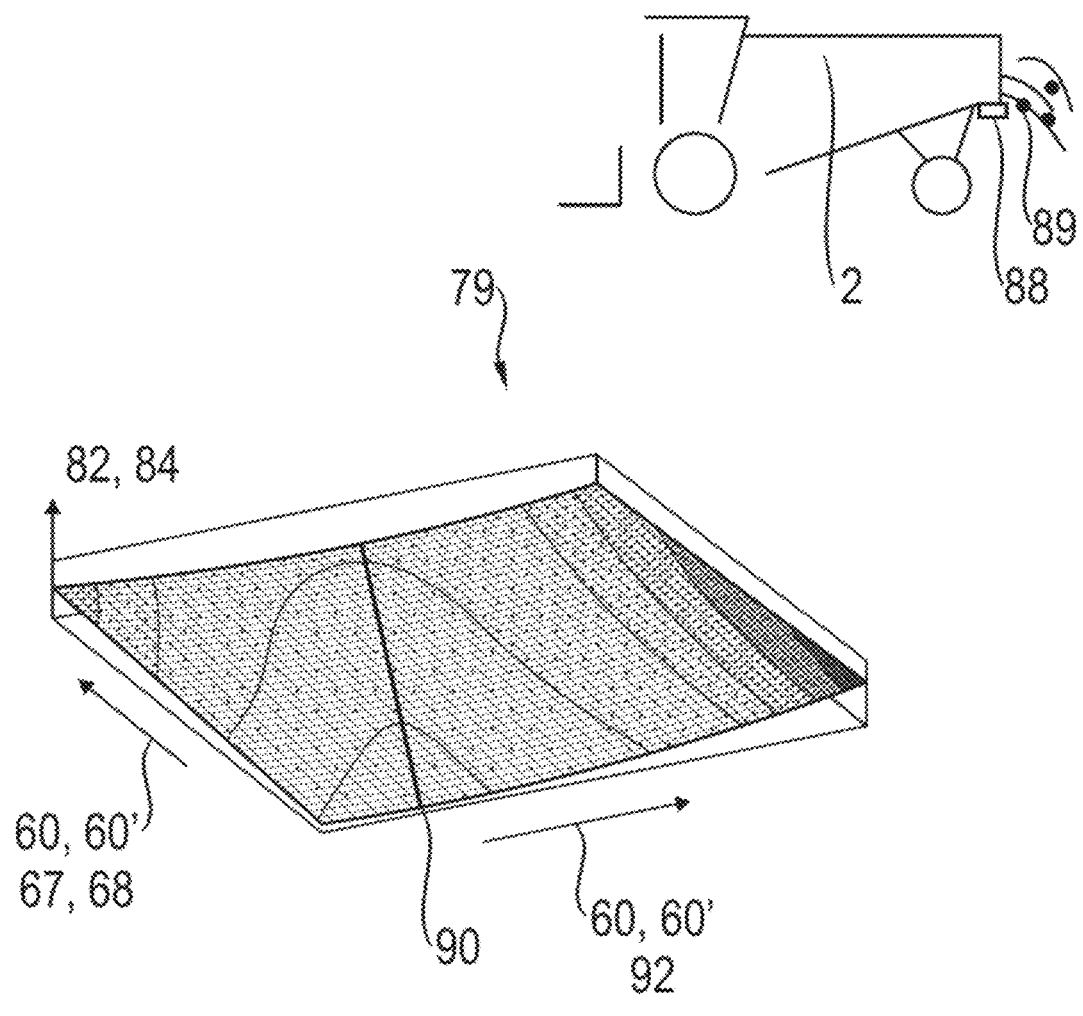

In FIGS. 4A-C and 5A-B, the characteristic diagrams 79 according to one or some embodiments are described in detail as a function of various quality parameters 82, wherein in FIGS. 4A-C, the quality parameter 82 is a vibration coefficient 83, explained in greater detail below, and in FIGS. 5A-B, the quality parameter 82 is a separation loss 84, which is also explained in more detail below. The vibration coefficient 83 known in the prior art is described in detail in US Patent Application Publication No. 2021/0235622 A1, incorporated by reference herein in its entirety. According to the disclosure of US Patent Application Publication No. 2021/0235622 A1, the vibration coefficient 83 may describe a fluctuation of the harvested material throughput passing through the combine 2. For this purpose, the layer height 9 of the flow of harvested material 10 passing through the combine 2 in the region of the inclined conveyor 5 may be recorded as a function of time. The determined layer height fluctuation may then be converted into the vibration coefficient 83 according to the method disclosed in US Patent Application Publication No. 2021/0235622 A1. The layer height 9 may be determined in a region located upstream of the threshing units 12 since the flow of harvested material 10 may be processed so intensively in the region of the threshing units 12 that layer height fluctuations in the flow of harvested material 10 after leaving the threshing units 12 no longer have a sufficient relationship to the harvested material throughput. The layer height 9 may be determined using the aforementioned layer height roller 8 in the region of the inclined conveyor 5, wherein the layer height roller 8 may be guided so as to be pivotable about a pivot axis 85, and the deflection 86 of the layer height roller 8 may be used as a measure for determining the layer height 9. In a manner known per se, the layer height roller 8 may be positioned above the inclined conveyor strips 87 which may affect the entrainment of the material, in such a way that their layer-height-dependent movement may be transmitted to the layer height roller 8 and effects the deflection 86 of the layer height roller 8.

The further quality parameter 82, according to FIGS. 5A-B the separation loss 84, describes the grain loss 89, namely the loss grain (interchangeably loss grain portion) exiting the combine 2 in its rear region. As a rule, the grain loss 89 in the rear region of the combine 2 may be determined in a manner known per se by means of suitable and sufficiently known grain loss sensors 88, which may be termed so-called knock sensors.

The characteristic diagrams 79 saved in the automatic draper 78 and/or the automated subunits 81 may be structured quite differently depending on which type of optimization is to be implemented. According to FIGS. 4A-C, the particular characteristic diagram 79 may describe the particular operating parameter 60 as a function of the vibration coefficient 83 and the harvested material throughput by the layer height 9 representing the harvested material throughput. According to FIGS. 5A-B, the particular characteristic diagram 79 may describe the particular operating parameter or parameters 60 at least as a function of the separation loss 84.

For the particular characteristic diagram 79 to enable the described characteristic diagram controller 80, as a result of which the automatic draper 78 and/or the automated subunits 81 generate optimized operating parameters 60', each characteristic diagram 79 may be assigned, in one or some embodiments, the control characteristic curve 90 which may extend in the particular characteristic diagram 79 along the minimum of the particular vibration coefficient 83 or the separation loss 84 and describes the particular optimal operating parameter 60'.

In one embodiment according to FIG. 4A, the characteristic diagram 79 may describe the relationship between the quality parameter vibration coefficient 83, the parameter layer height 9 representing the harvested material throughput, and the operating parameter 60 middle conveyor belt speed 65, with the control characteristic curve 90 assigned to the characteristic diagram 79 lies around the minimum vibration coefficient 83. As a tendency, it may be seen that the characteristic diagram controller 80 here is such that greater layer heights 9 necessitate higher belt speeds 65, while belt speeds 65 which are too high or too low tend to have a negative influence on the vibration coefficient 83 and thus on an optimized operating parameter 60'. In this regard, using the characteristic diagram 79 illustrated in FIG. 4A and using a value may be input for the parameter layer height may generate an output value for the middle conveyer belt speed 65 (e.g., based on the input of the parameter layer height 9 and the characteristic curve 90, which may seek to reduce or minimize vibration (as indicated by the control characteristic curve lying around the minimum vibration coefficient), a value for the middle conveyer belt speed 65 may be determined to reduce or minimize the vibration; in turn, the value for the middle conveyer belt speed 65 may be sent to the draper 4 for automatic execution).

In one embodiment according to FIG. 4B, the characteristic diagram 79 describes the relationship between the quality parameter vibration coefficient 83, the parameter layer height 9 representing the harvested material throughput, and the operating parameter 60 "belt speed of the right side/left side transverse conveyor belt" 63, 64, and wherein the control characteristic curve 90 assigned to the characteristic diagram 79 lies around the minimum vibration coefficient 83. As a tendency, it may be seen that the characteristic diagram controller 80 here is similar to FIG. 4A, wherein the particular influences that greater layer heights 9 may necessitate higher belt speeds 63, 64, while belt speeds 63, 64 which are too high or too low tend to have a negative influence on the vibration coefficient 83 and thus on an optimized operating parameter 60', are more pronounced. Thus, similar to the discussion above, the control characteristic curve 90 assigned to the characteristic diagram 79 in combination with the layer height 9 may be used to determine values for one or both of the belt speeds 63, 64 in order to reduce or minimize vibration.

In an embodiment according to FIG. 4C, the characteristic diagram 79 describes the relationship between the quality parameter of vibration coefficient 83, the parameter of layer height 9 representing the harvested material throughput, and the operating parameter 60 "reel horizontal position and/or reel vertical position" 67, 68, wherein the control characteristic curve 90 associated with the characteristic diagram 79 lies around the minimum of the vibration coefficient 83. It may be seen that the characteristic diagram controller 80 here does not follow a distinct tendency, but depends very specifically on the parameters related to each other. Due to the fact that a change in position 67, 68 of the reel 51 follows very complex relationships, the control characteristic curve 90 in this case does not extend through all areas of the characteristic diagram 79, but may be replaced by expert knowledge 91 in specific edge areas of the control characteristic curve 90. Thus, similar to the discussion above, the control characteristic curve 90 assigned to the characteristic diagram 79 in combination with the layer height 9 may be used to determine values for one or both of "reel horizontal position and/or reel vertical position" 67, 68 in order to reduce or minimize vibration.

In an embodiment according to FIG. 5A, the characteristic diagram 79 describes the relationship between the quality parameter of separation loss 84 and the operating parameters 60 "central belt speed" 65 and "belt speed of the left side and/or right side transverse conveyor belt" 63, 64, wherein the control characteristic curve 90 associated with the characteristic diagram 79 lies around the minimum of the separation loss 84. Generally, the influence of the belt speeds 63, 64, 65 on the separation loss 84 is moderate, and basically, all the belt speeds 63, 64, 65 have the same tendency, namely that if the belt speed 63, 64 of the left side and/or right side transverse conveyor belts 43, 44 increases or decreases, the optimized belt speed 65 of the central belt 45 also increases or decreases and vice versa. Thus, FIG. 5A may be used to reduce or minimize a different quality parameter (separation loss 84) than used in FIG. 4A. Nevertheless, the output (e.g., selecting a value for the middle conveyer belt speed 65) is the same. Thus, a first quality parameter (vibration coefficient 83) is the focus of FIG. 4A whereas a second quality parameter (separation loss 84) is the focus of FIG. 5A. In one or some embodiments, multiple quality parameters may be the focus of a respective characteristic diagram 79, such as both a first quality parameter (vibration coefficient 83) and a second quality parameter (separation loss 84).

In an embodiment according to FIG. 5B, the characteristic diagram 79 describes the relationship between the quality parameter of separation loss 84, the parameter "hydraulic pressure or power requirement of a reel drive motor/reel drive cylinder" 92 representing the harvested material throughput, and the operating parameter 60 "reel horizontal position and/or reel vertical position" 67, 68, wherein the control characteristic curve 90 associated with the characteristic diagram 79 lies around the minimum separation loss 84. It may be generally seen that, with increasing hydraulic pressure 92, i.e., with increasing throughput or a crop 42 that has grown taller, a greater reel height 67, 68 leads to lower separation losses 84.

Since the separation loss 84 may only be determined when the corresponding flow of harvested material 10 has completely passed through the combine 2, and the harvested material throughput which depends on the detected layer height 9 may be determined immediately after the flow of harvested material 10 has entered the combine 2, the adaptation of the particular characteristic diagram 79 as a function of the vibration coefficient 83 may result in a rapid adaptation of the particular characteristic diagram 79, whereas the adaptation of the particular characteristic diagram 79 as a function of the separation loss 84 may result in a slower adaptation of the particular characteristic diagram 79.

Figure 6A:
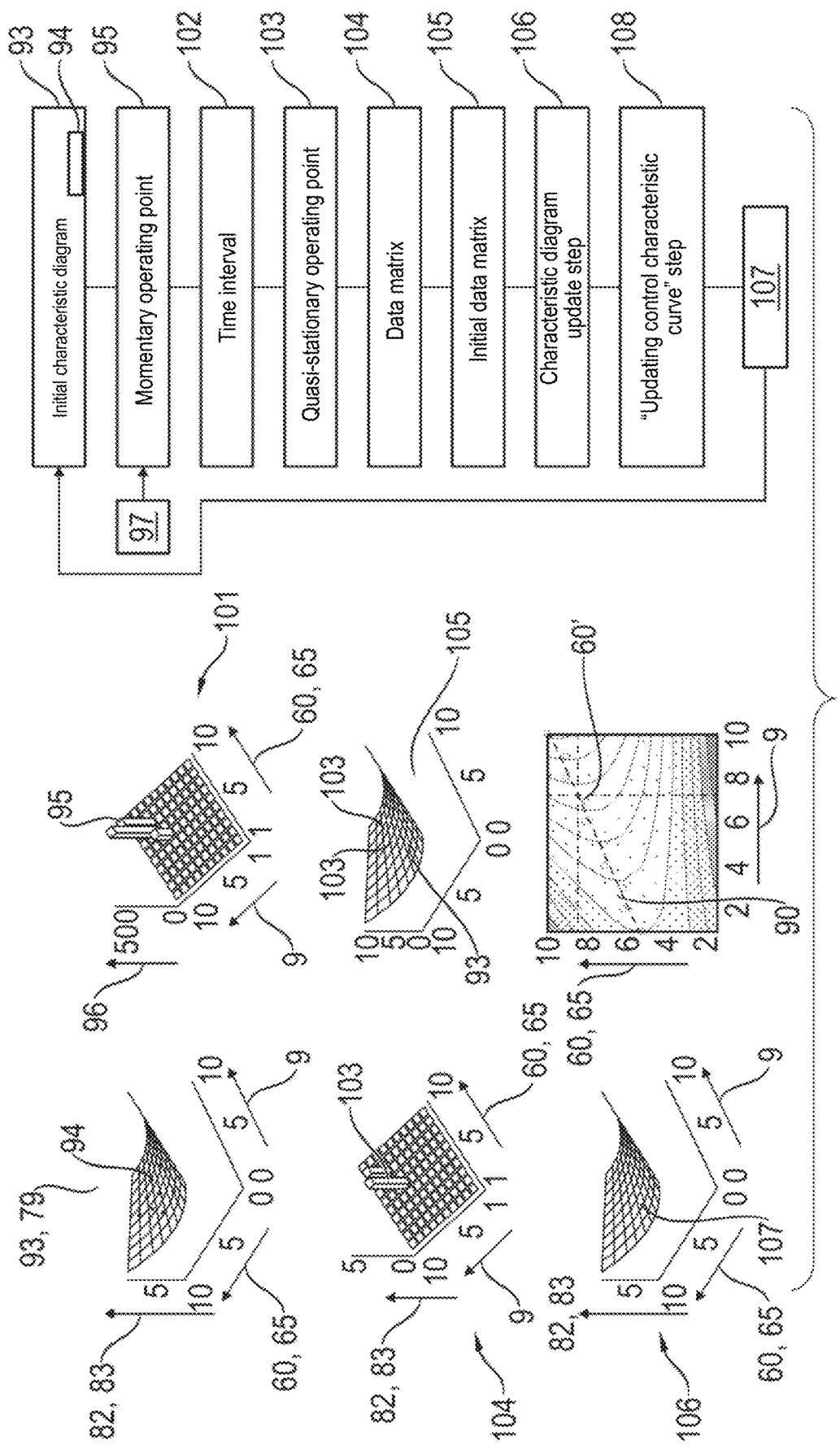
FIG. 6A illustrates a detailed representation of the characteristic diagram adaptation.
Figure 6B:
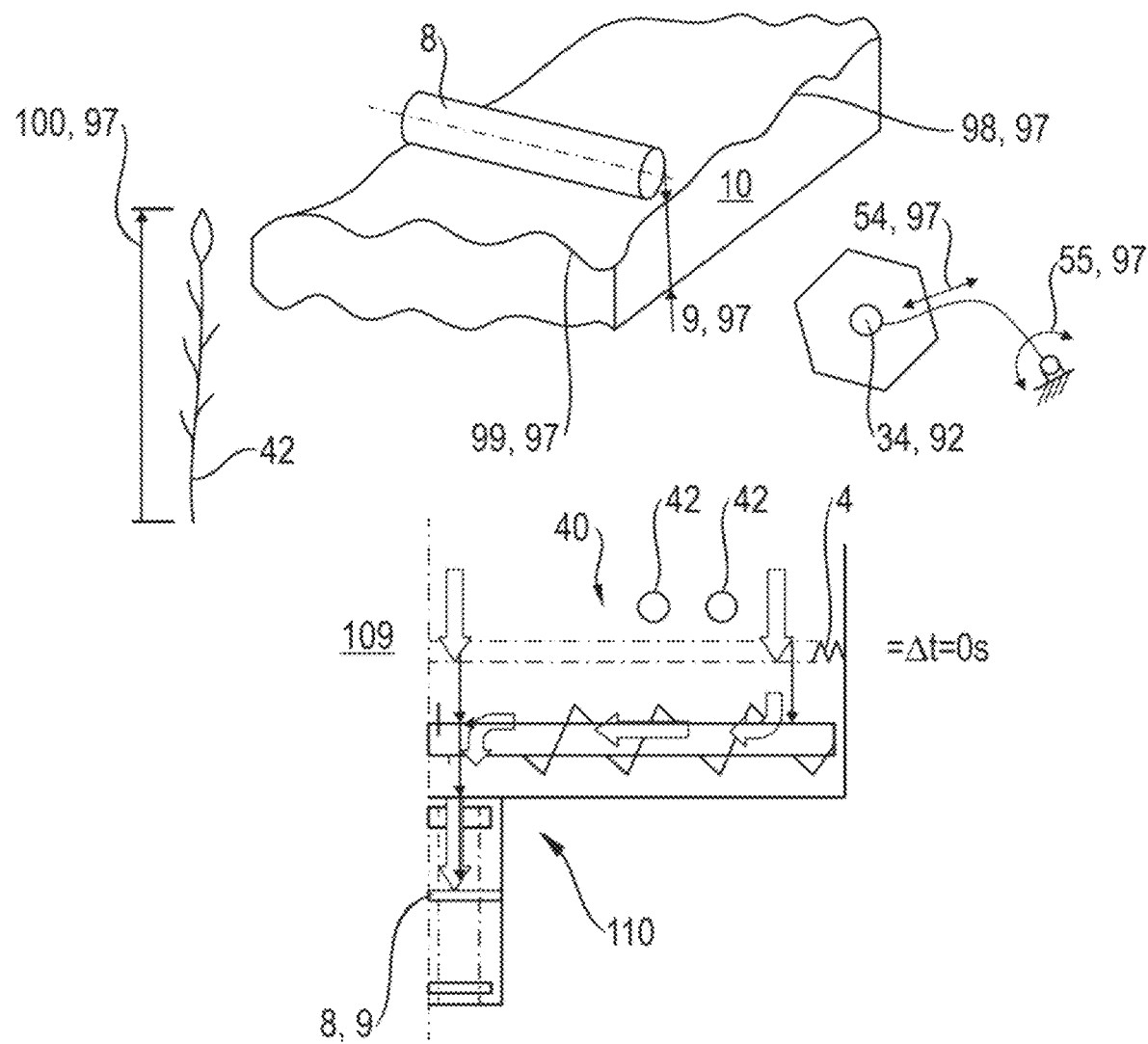
FIG. 6B illustrates detailed explanations of FIG. 6A.

The principle of characteristic diagram generation is described in FIG. 6A using the example of characteristic diagram 79 shown in FIG. 4A. Each of the characteristic diagrams 79 described in FIGS. 4A-C and 5A-B may be generated according to this principle. The characteristic diagram 79 may be saved in the automatic draper 78 and/or the automated subunits 81 as an initial characteristic diagram 93, wherein in the initial characteristic diagram 93, the described relationship between operating parameters 60, in this case the belt speed 65 of the process unit 59 central belt 45, and quality parameters 82, in this case the vibration coefficient 83 and the harvested material throughput-related parameter layer height 9, may be described by initial operating points 94. During harvesting mode of the combine 2, instantaneous operating points 95 may be determined for the layer height 9 and the operating parameters 60, in this case the belt speed 65 of the central belt 45 as a function of time 96. In order to determine the instantaneous operating points 95, measured variables 97 are used which, according to FIG. 6B, may be a longitudinal vibration 98 and/or a transverse vibration 99 of a flow of harvested material 10 passing through the agricultural harvesting machine 1 and/or a crop height 100 of the crop 42, and/or a hydraulic pressure 92 or power requirement of a reel drive motor 34. The measured variable of longitudinal vibration 98 may correspond to the layer height 9 determined using layer height roller 8 as a function of time, as previously described. Consequently, the measured variables 97 may be such that the quality parameters 82 of the vibration coefficient 83 and separation loss 84, as well as the layer height 9 proportional to throughput, may be derived therefrom.

The determined instantaneous operating points 95 may be temporarily saved in a data matrix 101, wherein the change in the value of the particular instantaneous operating point 95 may be determined within a time interval 102, and the instantaneous operating point 95 may then be transferred to a quasi-stationary operating point 103 if its value remains approximately unchanged, or constant. A preferred time interval 102 may be six seconds in this case. In one or some embodiments, the time interval 102 is at least long enough to compensate for a dead time interval 109 in the measurement chain 110. For example, the crop 42 entering the draper 4 in the harvested material infeed side region 40 may not reach the described layer height roller 8 until a certain time has elapsed. This time offset between input of material and measurement of the layer height 9, which may depend to a large extent on the working width of the draper 4 and the material conveying speed, may be taken into account during said dead time interval 109 (see FIG. 6B).

The determined quasi-stationary operating points 103 may then be collected in a data matrix 104. If a certain number of quasi-stationary operating points 103 has been collected in the data matrix 104, such as four quasi-stationary operating points 103, the dependencies may be determined between quality parameter 82, in this case vibration coefficient 83, the throughput-proportional layer height 9 and the operating parameter 60, in this case belt speed 65 of the central belt 45 process unit, may be determined in this data matrix 104 for the collected quasi-stationary operating points 103 analogous to the particular initial characteristic diagram 93. In a next step, the quasi-stationary operating points 103 may be transferred to an initial data matrix 105 which may correspond to the initial characteristic diagram 93 with transferred quasi-stationary operating points 103. Then, in a characteristic diagram update step 106, the updated characteristic diagram 107 may be calculated which may replace the initial characteristic diagram 93. For the updated characteristic diagram 107 to also enable the described characteristic diagram controller 80, as a result of which the automatic draper 78 and/or the automated subunits 81 generate optimized operating parameters 60', the control characteristic curve 90 may be recalculated for each updated characteristic diagram 107 in a step of "updating control characteristic curve" 108, which control characteristic curve 90 may extend in each updated characteristic diagram 107 along the minimum of the particular vibration coefficient 83 or of the separation loss 84 and may describe each optimal operating parameter 60'.

Each updated characteristic diagram 107 may then again form the particular initial characteristic diagram 93 for a subsequent characteristic diagram adaptation process in the particular automatic draper 78 and/or the particular automated subunit 81.

Figure 7:
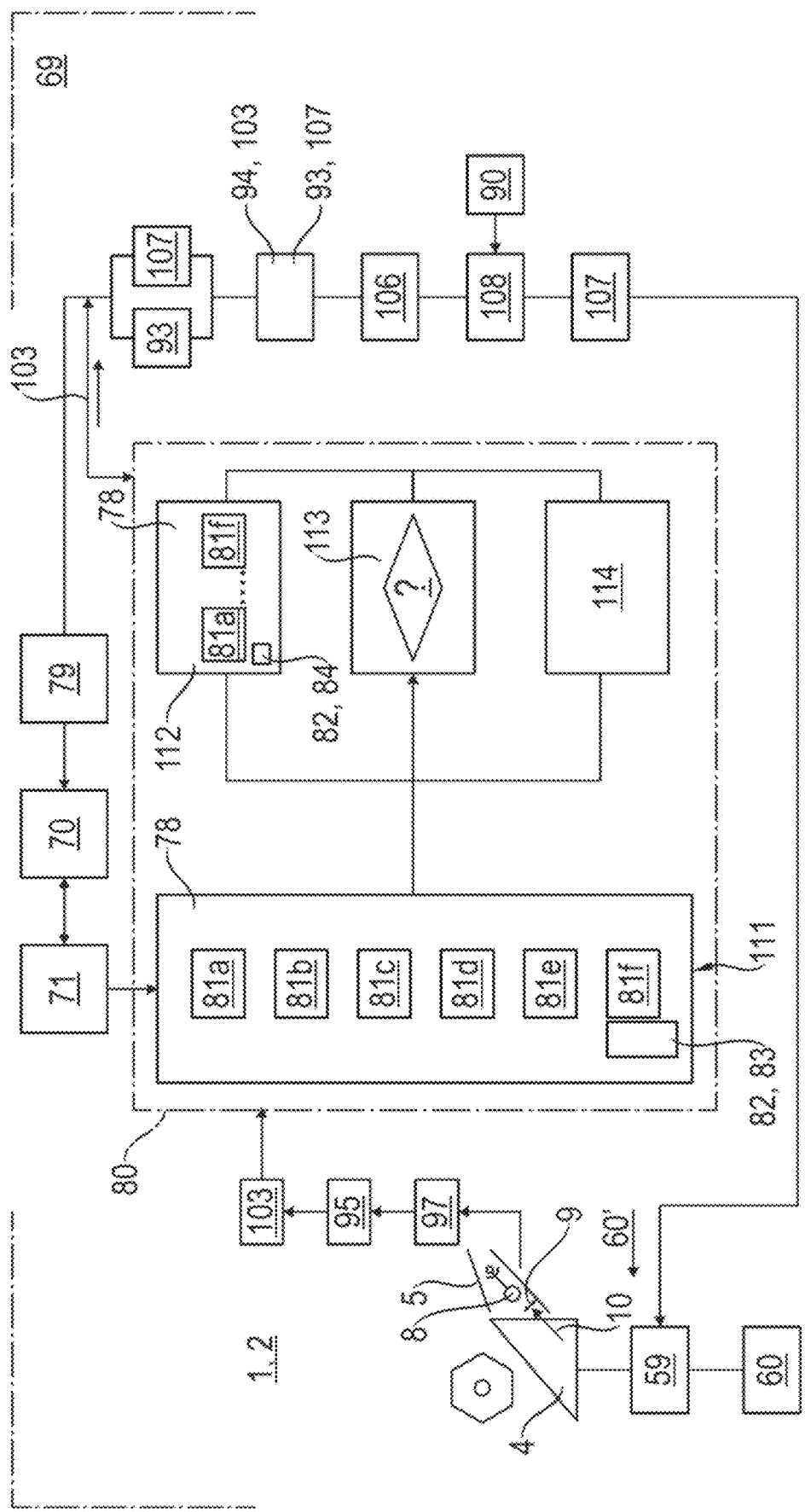
FIG. 7 illustrates a schematic representation of the operation of the driver assistance system.

Finally, FIG. 7 describes the driver assistance system 69 according to one aspect of the invention in context. According to the preceding explanations, the draper 4 may form, together with the driver assistance system 69, an automatic draper 78 which may at the same time comprise automated subunits 81a, 81b, 81c, 81d, 81e, 81f. By storing characteristic diagrams 79 in the memory 70 of the driver assistance system 69 and by setting up the computing device 71 to operate the automatic draper 78 and/or the automated subunits 81a, 81b, 81c, 81d, 81e, 81f as a characteristic diagram controller 80 using the saved characteristic diagrams 79, the automatic draper 78 and/or the automated subunits 81a, 81b, 81c, 81d, 81e, 81f are able to optimize operating parameters 60 of the process units 59 of the draper 4 and to specify the optimized operating parameters 60' to the process units 59 of the draper 4. For this purpose, in a first step, the driver assistance system 69 may determine the described measured variables 97 of the draper 4 and of the agricultural harvesting machine 1. At least from the determined measured variables 97, the driver assistance system 69 according to one aspect of the invention may then generate the instantaneous operating points 95 of the automatic draper 78 and/or of the semi-automatic units 81a, 81b, 81c, 81d, 81e, 81f. In a next data processing step, the driver assistance system 69 may convert the instantaneous operating points 95 into quasi-stationary operating points 103 in the manner described above, and then may transmit these quasi-stationary operating points 103 to the automatic draper 78 and/or automated subunits 81a, 81b, 81c, 81d, 81e, 81f. The characteristic diagram controller 80 implemented by the automatic draper 78 and/or the particular automated subunits 81a, 81b, 81c, 81d, 81e, 81f may be such that the quasi-stationary operating points 103 are transferred to the already described particular initial characteristic diagram 93 or already updated the characteristic diagram 107. In the particular characteristic diagram 93, 107, the initial operating point 94 saved therein may then be replaced by the quasi-stationary operating point 103. As described, a number of quasi-stationary operating points 103 may first be transferred to the particular characteristic diagram 93, 107, wherein each of these quasi-stationary operating points 103 replaces an initial operating point 94. Then, a characteristic diagram update step 106 may be started which may result in the particular characteristic diagram 93, 107 being recalculated on the basis of the determined quasi-stationary operating points 103. In the subsequent process step of "updating control characteristic curve" 108, a new control characteristic curve 90 of the particular characteristic diagram 93, 107 may be determined, and ultimately the characteristic diagram and associated control characteristic curve 90 redetermined in this way may form the particular updated characteristic curve 107. The driver assistance system 69 may then use the updated characteristic diagram 107 to determine the particular optimized operating parameters 60' which has already been described, and may specify them to the particular process unit 59.

The characteristic diagram controller 80 of the automatic draper 78 and/or of the semi-automatic units 81a, 81b, 81c, 81d, 81e, 81f may also be such that it permits a fast, a dynamic characteristic diagram adaptation 111 and a sluggish characteristic diagram adaptation 112. A dynamic characteristic diagram adaptation 111 may be achieved when the quality parameter 82 of the particular characteristic diagram 79 is formed by the described vibration coefficient 83. The quality parameter "vibration coefficient 83" may therefore permit fast, dynamic characteristic diagram adaptation, since this quality parameter 82 may depend on the layer height 9 detected in the layer height roller 8 positioned in the inclined conveyor 5 and may be determined immediately directly after the flow of harvested material 10 enters the agricultural harvesting machine 1 (interchangeably termed agricultural working machine). In contrast, the sluggish characteristic diagram adaptation 112 may be established by the fact that the quality parameter 82 of the particular characteristic diagram 79 may be formed by the separation loss 84 already described, and this may only be measured when the residual material stream 33 (interchangeably termed residual material flow) and the loss grains contained therein leave the agricultural harvesting machine 1 in the rear region thereof. Although generated at a late point in time, the sluggish characteristic diagram adaptation 112 may have the advantage that it detects a parameter, in this case the separation loss 84, which decisively determines the working quality of the agricultural harvesting machine 1, and high separation losses 84 are always also an indicator of a non-optimal flow of harvested material in the agricultural harvesting machine 1, wherein a non-optimal flow of harvested material in the agricultural harvesting machine 1 may be counteracted in particular if the harvesting header 3, in this case the draper 4, produces a homogeneous flow of harvested material 10 which may then be continuously transferred to the agricultural harvesting machine 1.

In addition, the driver assistance system 69 may be such that the characteristic diagram controller 80 comprises a test step 113 in which it is tested whether opposing tendencies for the value of the particular optimized operating parameter 60' occur for the operating parameters 60 to be optimized when the dynamic characteristic diagram adaptation 111 and the sluggish characteristic diagram adaptation 112 are applied. If this is the case, one embodiment of the invention provides that boundary conditions are used to decide which operating point resulting from the control characteristic is approached. In one or some embodiments, the mentioned boundary conditions are saved in a cost function which may consider the parameters throughput/h, vibration coefficient, separation losses and cutter losses, and wherein these parameters may be weighted differently.

Further, the driver assistance system 69 may be such that it takes expert knowledge 114 into account when generating the particular characteristic diagrams 79, which may be both the initial characteristic diagrams 93 and the updated characteristic diagrams 107.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural harvesting machine
2 Combine
3 Harvesting header
4 Draper
5 Inclined conveyor
6 Conveying elements
7 Pivot axis
8 Layer height roller
9 Layer height
10 Harvested material flow
11 Threshing concave
12 Threshing unit
13 Deflection drum
14 Separating rotor assembly
15 Separating device
16 Grains
17 Returns pan
18 Feed pan
19 Screening level
20 Screening level
21 Fan
22 Cleaning device
23 Elevator
24 Grain tank
25 Grain flow
26 housing
27 Straw chopper
28 Shredding device
29 Separating rotor assembly
30 Straw
31 Ground
32 Crop distribution device
33 Residual material flow
34 Reel drive motor
35 Arrow direction
40 Harvested material infeed side region
41 Cutter bar
42 Plant crop
43 Left side transverse conveyor belt
44 Right side transverse conveyor belt
45 Central belt
46-49 Arrow direction
50 Feed roller
51 Reel
52-53 Arrow direction
54.55 Pressure cylinder
56 Separating rotor assembly
57 Frame
58 Driving tines
59 Driving tines
60 Operating parameter
60' Optimized operating parameter
61 Cutting speed
62 Cutter stroke
63, 64, 65 Belt speed
66 Feed roller horizontal position 67 Reel vertical position
68 Reel horizontal position
69 Driver assistance system
70 Memory
71 Computer device
72 Internal information
73 External information
74 Saved information
75 Cabin
76 Operating and display unit
77 Driver
78 Automatic draper
79 Characteristic diagram
80 Characteristic diagram controller
81 Semi-automatic unit
82 Quality parameter
83 Vibration coefficient
84 Separation loss
85 Pivot axis
86 Deflection
87 Inclined conveyor strips
88 Grain loss sensor
89 Grain loss
90 Control characteristic curve
91 Expert knowledge
92 Hydraulic pressure
93 Initial characteristic diagram
94 Initial operating point
95 Momentary operating point
96 Time
97 Measured variable
98 Longitudinal vibration
99 Transverse vibration
100 Crop height
101 Data matrix
102 Time interval
103 Quasi-stationary operating point
104 Data matrix
105 Initial data matrix
106 Characteristic diagram update step
107 Updated characteristic diagram
108 "Updating control characteristic curve"
109 Dead time interval
110 Measuring chain
111 Dynamic characteristic diagram adaptation
112 Sluggish characteristic diagram adaptation
113 Test step
114 Expert knowledge
115 Processor

The invention claimed is:

1. An agricultural harvesting machine with a harvesting header designed as a draper for cutting and picking up harvested material, the agricultural harvesting machine comprising:
a driver assistance system comprising at least one memory and at least one computing device in communication with the memory, the at least one memory is configured to store data and one or more characteristic diagrams, the at least one computing device configured to process the data saved in the memory;
wherein the draper comprises at least one central belt configured to convey harvested material to one or both of a feed roller or an intake channel of an inclined conveyor, at least one left side transverse conveyor belt positioned on a left side and at least one right side transverse conveyor belt positioned on a right side of the at least one central belt for conveying the harvested material to the at least one central belt, the at least one central belt, the at least one left side transverse conveyor belt and the at least one right side transverse conveyor belt being positioned behind a cutter bar in a direction of travel, and a belt cutting mechanism configured to accommodate a reel, wherein the at least one central belt is positioned between the left side and the right side;
wherein the driver assistance system, in working with the draper, comprises an automatic draper, the automatic draper comprising a characteristic diagram controller configured to:
optimize, using the one or more characteristic diagrams, one or more operating parameters of the draper; and
specify the one or more operating parameters to the draper in order for the draper to automatically implement the one or more operating parameters for controlling one or more of the at least one central belt, the at least one left side transverse conveyor belt, the at least one right side transverse conveyor belt, the cutter bar, the belt cutting mechanism, or the reel;
wherein the one or more characteristic diagrams is configured to describe a relationship between a vibration coefficient quality parameter, a layer height parameter indicative of harvested material throughput, and a central belt speed operating parameter; and
wherein a control characteristic curve assigned to the one or more characteristic diagrams lies in a region of a minimum vibration coefficient.

2. The agricultural harvesting machine of claim 1, wherein the at least one right side transverse conveyor belt, the at least one left side transverse conveyor belt, the at least one central belt, the feed roller, the reel, or the cutter bar form process units of the draper; and
wherein the automatic draper is configured to:
generate, based on the at least one of the one or more characteristic diagrams, one or more optimized operating parameters for control of the process units of the draper; and
send, to the process units of the draper, the one or more optimized operating parameters for automatic execution by the process units of the draper;
wherein the automatic draper is configured to form one or more process-unit-specific automated subunits by forming: one or more automatic transverse conveyor belt machines, an automatic central belt, an automatic reel machine, an automatic cutter bar; and an automatic infeed roller; and
wherein the process-unit-specific automated subunits are configured to optimize the one or more operating parameters of the at least one right side transverse conveyor belt, the at least one left side transverse conveyor belt, the at least one central belt, the reel, the cutter bar, or the feed roller of the draper in order to generate the optimized operating parameters for the process units; and
wherein the automatic draper is configured to specify the optimized operating parameters to each of the process units of the draper for automatic control of the process units.

3. The agricultural harvesting machine of claim 2, wherein the one or more characteristic diagrams associated with the automatic draper describe a relationship between the one or more operating parameters of the process units and one or more quality parameters.

4. The agricultural harvesting machine of claim 2, wherein the driver assistance system is configured to use the one or more characteristic diagrams in order to determine the one or more operating parameters of a feed roller process unit; and
    wherein the one or more operating parameters comprises one or more of feed roller horizontal position or feed roller speed.

5. The agricultural harvesting machine of claim 2, wherein the one or more characteristic diagrams are assigned to each of the process-unit-specific automated subunits; and
    wherein the at least one of the one or more characteristic diagrams describes a correlation between operating parameters of a respective process unit assigned to a respective process-unit-specific automated subunit and respective one or more quality parameters.

6. The agricultural harvesting machine of claim 5, wherein the one or more characteristic diagrams correlates layer height indicative of harvest material throughput to at least one operating parameter for the draper; and
    wherein the automatic draper is configured to transmit to the draper the at least one operating parameter for the draper for automatic execution by the draper.

7. The agricultural harvesting machine of claim 5, wherein the one or more operating parameters comprises belt speed of the at least one right side transverse conveyor belt, belt speed of the at least one left side transverse conveyor belt, or belt speed of the at least one central belt;
    wherein the one or more characteristic diagrams, responsive to one or more inputs, generates one or more values for the belt speed of the at least one right side transverse conveyor belt, the belt speed of the at least one left side transverse conveyor belt, and the belt speed of the at least one central belt; and
    wherein the automatic draper is configured to transmit to the draper the one or more values for the belt speed of the at least one right side transverse conveyor belt, the belt speed of the at least one left side transverse conveyor belt, and the belt speed of the at least one central belt for the draper to change respective belt speeds of the draper.

8. The agricultural harvesting machine of claim 5, wherein a vibration coefficient is indicative of a fluctuation of harvested material throughput; and
    wherein the driver assistance system is configured to receive the harvested material throughput and the vibration coefficient describing the fluctuation in the harvested material throughput in a region lying in front of one or more threshing units of the agricultural harvesting machine; and
    wherein a separation loss is indicative of a loss grain portion separated from the agricultural harvesting machine.

9. The agricultural harvesting machine of claim 1, wherein the one or more characteristic diagrams correlate a separation loss indicative of a loss grain portion separated from the agricultural harvesting machine to at least one operating parameter for the draper; and
    wherein the automatic draper is configured to transmit to the draper the at least one operating parameter for the draper for automatic execution by the draper.

10. The agricultural harvesting machine of claim 1, wherein a control characteristic is assigned to at least one characteristic diagram for a vibration coefficient indicative of a fluctuation of harvested material throughput and a separation loss indicative of a loss grain portion separated from the agricultural harvesting machine; and
    wherein the control characteristic lies in a region of a minimum of the vibration coefficient and the separation loss.

11. The agricultural harvesting machine of claim 1, wherein the one or more characteristic diagrams describe a relationship between a vibration coefficient quality parameter, a layer height parameter indicative of harvested material throughput, and both of a reel horizontal position operating parameter and a reel vertical position operating parameter; and
    wherein a control characteristic curve assigned to the one or more characteristic diagrams lies in a region of a minimum vibration coefficient.

12. The agricultural harvesting machine of claim 1, wherein the one or more characteristic diagrams describe a relationship between: (1) a separation loss; (2) hydraulic pressure parameter or a power requirement of a reel drive motor or reel drive cylinder representing harvested material throughput; and (3) one or both of reel horizontal position operating parameter or reel vertical position operating parameter; and
    wherein a control characteristic curve assigned to the one or more characteristic diagrams lies around in a region of a minimum of the separation loss.

13. The agricultural harvesting machine of claim 1, wherein the driver assistance system is further configured to modify the one or more characteristic diagrams by superimposing a faster characteristic diagram modification of vibration coefficient and a slower characteristic diagram modification of a separation loss;
    wherein the faster characteristic diagram modification is based on a quality parameter that is formed by the vibration coefficient; and
    wherein the slower characteristic diagram modification is based on the quality parameter that is formed by the separation loss.

14. The agricultural harvesting machine of claim 1, further comprising a cost function configured to decide which operating point resulting from control characteristic curve assigned to the one or more characteristic diagrams is approached; and
    wherein the cost function comprises one or more parameters of throughput, vibration coefficient, separation losses, or cutter losses.

15. The agricultural harvesting machine of claim 1, wherein the driver assistance system is further configured to calculate a time to modify the one or more characteristic diagrams based on operation of the draper.

16. The agricultural harvesting machine of claim 15, wherein the time for modifying the one or more characteristic diagrams is based on, at least in part, on conveying speed of material flow in the draper.

17. The agricultural harvesting machine of claim 1, wherein the one or more characteristic diagrams is configured to describe a relationship between a vibration coefficient quality parameter, a layer height parameter indicative of harvested material throughput, and at least one of right side or left side belt speed operating parameter; and
    wherein a control characteristic curve assigned to the one or more characteristic diagrams lies in a region of a minimum vibration coefficient.

18. An agricultural harvesting machine with a harvesting header designed as a draper for cutting and picking up harvested material, the agricultural harvesting machine comprising:

a driver assistance system comprising at least one memory and at least one computing device in communication with the memory, the at least one memory is configured to store data and one or more characteristic diagrams, the at least one computing device configured to process the data saved in the memory;

wherein the draper comprises at least one central belt configured to convey harvested material to one or both of a feed roller or an intake channel of an inclined conveyor, at least one left side transverse conveyor belt positioned on a left side and at least one right side transverse conveyor belt positioned on a right side of the at least one central belt for conveying the harvested material to the at least one central belt, the at least one central belt, the at least one left side transverse conveyor belt and the at least one right side transverse conveyor belt being positioned behind a cutter bar in a direction of travel, and a belt cutting mechanism configured to accommodate a reel, wherein the at least one central belt is positioned between the left side and the right side;

wherein the driver assistance system, in working with the draper, comprises an automatic draper, the automatic draper comprising a characteristic diagram controller configured to:
- optimize, using the one or more characteristic diagrams, one or more operating parameters of the draper; and
- specify the one or more operating parameters to the draper in order for the draper to automatically implement the one or more operating parameters for controlling one or more of the at least one central belt, the at least one left side transverse conveyor belt, the at least one right side transverse conveyor belt, the cutter bar, the belt cutting mechanism, or the reel;

wherein the driver assistance system is further configured to modify the one or more characteristic diagrams as a function of vibration coefficient based on a layer height detected in a layer height roller;

wherein the driver assistance system is further configured to modify the one or more characteristic diagrams as a function of a separation loss based on the separation loss;

wherein the driver assistance system is configured to modify the one or more characteristic diagrams as the function of vibration coefficient responsive to harvested material flow entering the agricultural harvesting machine; and wherein the driver assistance system is configured to modify the one or more characteristic diagrams as the function of the separation loss responsive to the harvested material flow exiting the agricultural harvesting machine.

19. An agricultural harvesting machine with a harvesting header designed as a draper for cutting and picking up harvested material, the agricultural harvesting machine comprising:

a driver assistance system comprising at least one memory and at least one computing device in communication with the memory, the at least one memory is configured to store data and one or more characteristic diagrams, the at least one computing device configured to process the data saved in the memory;

wherein the draper comprises at least one central belt configured to convey harvested material to one or both of a feed roller or an intake channel of an inclined conveyor, at least one left side transverse conveyor belt positioned on a left side and at least one right side transverse conveyor belt positioned on a right side of the at least one central belt for conveying the harvested material to the at least one central belt, the at least one central belt, the at least one left side transverse conveyor belt and the at least one right side transverse conveyor belt being positioned behind a cutter bar in a direction of travel, and a belt cutting mechanism configured to accommodate a reel, wherein the at least one central belt is positioned between the left side and the right side;

wherein the driver assistance system, in working with the draper, comprises an automatic draper, the automatic draper comprising a characteristic diagram controller configured to:
- optimize, using the one or more characteristic diagrams, one or more operating parameters of the draper; and
- specify the one or more operating parameters to the draper in order for the draper to automatically implement the one or more operating parameters for controlling one or more of the at least one central belt, the at least one left side transverse conveyor belt, the at least one right side transverse conveyor belt, the cutter bar, the belt cutting mechanism, or the reel;

further comprising a cost function configured to decide which operating point resulting from control characteristic curve assigned to the one or more characteristic diagrams is approached; and wherein the cost function comprises parameters of throughput, vibration coefficient, separation losses, and cutter losses.

* * * * *

UNITED STATES PATENT AND TRADEMARK OFFICE
CERTIFICATE OF CORRECTION

PATENT NO. : 12,284,944 B2  
APPLICATION NO. : 17/953816  
DATED : April 29, 2025  
INVENTOR(S) : Joachim Baumgarten et al.

Page 1 of 1

It is certified that error appears in the above-identified patent and that said Letters Patent is hereby corrected as shown below:

In the Claims (Claim 2; Lines 45-47):
"wherein the automatic draper is configured to form one or more process-unit-specific automated subunits by forming:"

Should be replaced with:
"wherein the automatic draper is configured to form process-unit-specific automated subunits by forming:"

Signed and Sealed this  
Third Day of June, 2025

Coke Morgan Stewart  
*Acting Director of the United States Patent and Trademark Office*